US012552281B1

(12) United States Patent
Lyu

(10) Patent No.: US 12,552,281 B1
(45) Date of Patent: Feb. 17, 2026

(54) METHOD AND SYSTEM FOR MANAGING ENERGY, AND BUILDING EMPLOYING SYSTEM

(71) Applicant: HON HAI PRECISION INDUSTRY CO., LTD., New Taipei (TW)

(72) Inventor: Yu-Syuan Lyu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/975,074

(22) Filed: Dec. 10, 2024

(30) Foreign Application Priority Data

Nov. 4, 2024 (CN) .......................... 202411561298.3

(51) Int. Cl.
  *B60L 53/53* (2019.01)
  *B60L 55/00* (2019.01)
  *F03B 13/06* (2006.01)
  *H02K 7/18* (2006.01)

(52) U.S. Cl.
  CPC ............... *B60L 53/53* (2019.02); *B60L 55/00* (2019.02); *F03B 13/06* (2013.01); *H02K 7/1823* (2013.01); *F05B 2260/422* (2020.08)

(58) Field of Classification Search
  CPC .......... B60L 53/53; B60L 55/00; F03B 13/06; H02K 7/1823; F05B 2260/422
  See application file for complete search history.

(56) References Cited

U.S. PATENT DOCUMENTS

2010/0253080 A1* 10/2010 DeAngeles ........... F03B 17/005
  290/52

FOREIGN PATENT DOCUMENTS

CN    103124845    8/2016
CN    117231409    12/2023

* cited by examiner

*Primary Examiner* — Joseph Ortega
(74) *Attorney, Agent, or Firm* — ScienBiziP, P.C.

(57) ABSTRACT

An energy managing method for managing power supply of an object building includes: determining whether the object building exists a demand for electricity replenishment according to an electricity situation of the object building; when the object building exists the demand for electricity replenishment, controlling a first valve connected with a first water pipeline to open, the first water pipeline being installed between a first water storage unit and a second water storage unit, an installation position of the first water storage unit being higher than an installation position of the second water storage unit; and using electricity generated by a hydroelectric unit to power the object building. When the first valve is opened, water flow from the first water storage unit to the second water storage unit driving the hydroelectric unit to generate the electricity. An energy managing system and a building are also provided.

20 Claims, 10 Drawing Sheets

METHOD AND SYSTEM FOR MANAGING ENERGY, AND BUILDING EMPLOYING SYSTEM

TECHNICAL FIELD

The subject matter herein generally relates to energy managing technologies.

BACKGROUND

With an increasing demand for energy efficiency and global emphasis on environmental sustainability, how to efficiently manage energy is a major challenge. Especially in cities, instabilities in power supplies and power demands makes energy management technology particularly important.

Therefore, there is a need of providing an improved energy management method.

BRIEF DESCRIPTION OF THE DRAWINGS

Implementations of the present disclosure will now be described, by way of embodiments, with reference to the attached figures.

DETAILED DESCRIPTION

Figure 1:
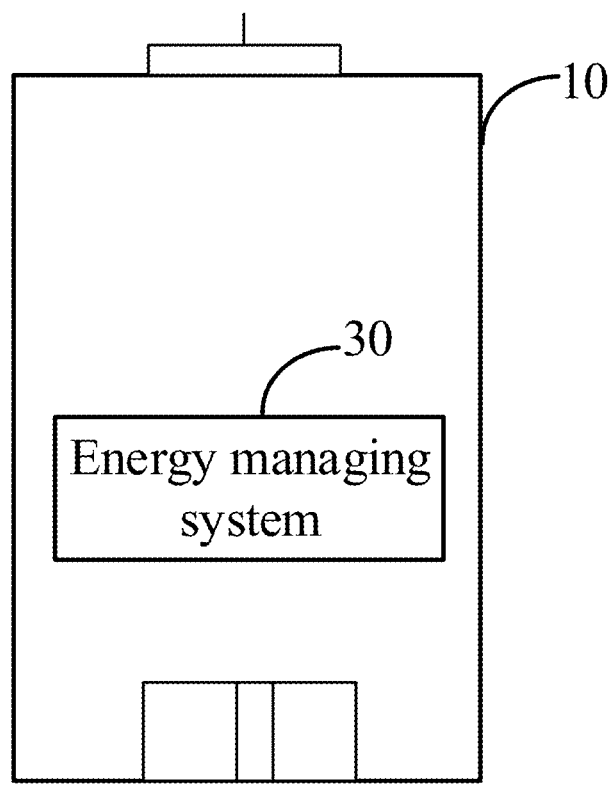
FIG. 1 is a block diagram illustrating a building employing an energy managing system according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasable connected. The term "comprising," when utilized, means "including, but not necessarily limited to"; it specifically indicates open-ended inclusion or membership in the so-described combination, group, series, and the like.

With an increasing demand for energy and a global emphasis on environmental sustainability, how to efficiently manage energy is a major challenge. In one embodiment, a gravity energy managing system can be used. The gravity energy managing system converts electrical energy into potential energy of heavy objects for storing. For example, when electricity is superfluous or when a price of electricity is low, the electricity can be used to lift the heavy objects to a upper floor of a building for storing, electrical energy is converted into potential energy. When a power demand of the building is rose or a price of electricity is high, the heavy objects is fell to a lower floor through gravity. The gravity energy managing system converts potential energy of the heavy objects into electrical energy, to supply power for the building. While the gravity energy managing system exists some defects, for example, the heavy objects falling from the upper floor to the lower floor may pose a safety risk, and noises may be generated by the falling of the heavy objects.

In one embodiment, an energy managing system based on water flow is provided.

FIG. 1 illustrates one exemplary embodiment of an object building 10. The object building 10 can be a building with a certain height, preferably a multi-floor building, such as a high-rise building in a urban environment.

An energy managing system 30 can be configured to the object building 10, the energy managing system 30 can achieve an energy management of the object building 10.

Figure 2:
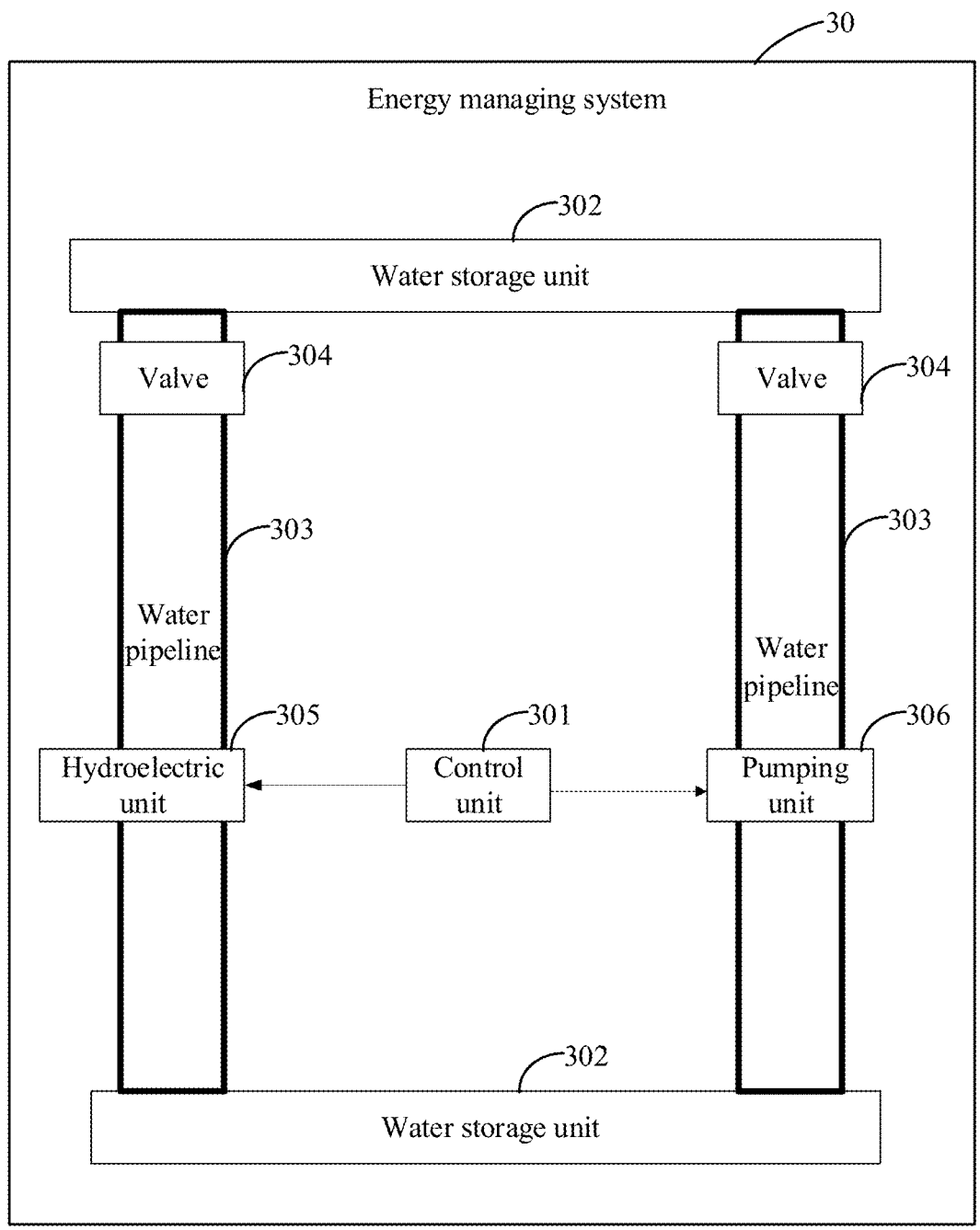
FIG. 2 is a block diagram illustrating the energy managing system shown in FIG. 1.

Referring to FIG. 2, The energy managing system 30 may include a control unit 301, a plurality of water storage units 302 (FIG. 2 shows two water storage units 302 as an example), a plurality of water pipelines 303 (FIG. 2 shows two water pipelines 303 as an example), at least one valve 304 (FIG. 2 shows two valves 304 as an example), at least one hydroelectric unit 305 (FIG. 2 shows one hydroelectric unit 305 as an example), and at least one pumping unit 306 (FIG. 2 shows one pumping unit 306 as an example).

The control unit 301 can be configured to perform an energy managing method as described below.

The plurality of water storage units 302 is configured to store water. The plurality of water storage units 302 can be installed at different heights on the object building 10. For example, the plurality of water storage units 302 can be installed at different floors of the object building 10. The plurality of water storage units 302 can be connected through the plurality of water pipelines 303.

The at least one valve 304 is connected with the plurality of water pipelines 303. The control unit 301 can be configured to control an operation state of the at least one valve 304, to control a state of water flow in the plurality of water pipelines 303. For example, the control unit 301 is communicated with the at least one valve 304, the control unit 301 can turn on of turn off the at least one valve 304, or adjust flow velocity of water flow in the plurality of water pipelines 303.

The at least one hydroelectric unit 305 is connected with the plurality of water pipelines 303. The control unit 301 is communicated with the at least one hydroelectric unit 305, and the control unit 301 can control the at least one hydroelectric unit 305 to convert kinetic energy of water flow into electrical energy.

The at least one pumping unit 306 is connected with the plurality of water pipelines 303. The control unit 301 is communicated with the at least one pumping unit 306, and the control unit 301 can control the at least one pumping unit 306 to pump water and drive pumped water to flow along a preset direction.

Comparing with the gravity energy managing system, the energy managing system uses water as energy storage medium, and a cost of water is less than a cost of heavy objects. Especially, in a high-rise building, water storage areas and water transmission pipelines are already established, causing a cost of the energy managing system being low. Noises generated by water flow is far less than the falling of heavy objects, and water flow control is simple and effective. Therefore, the embodiment can make a use of characteristics of a water storage system and height differences between different floors of the building, and design an energy storage and management system suitable for a high-rise environment, so as to achieve more efficient, safe, low-cost, and better energy management in the high-rise environment.

Figure 3:
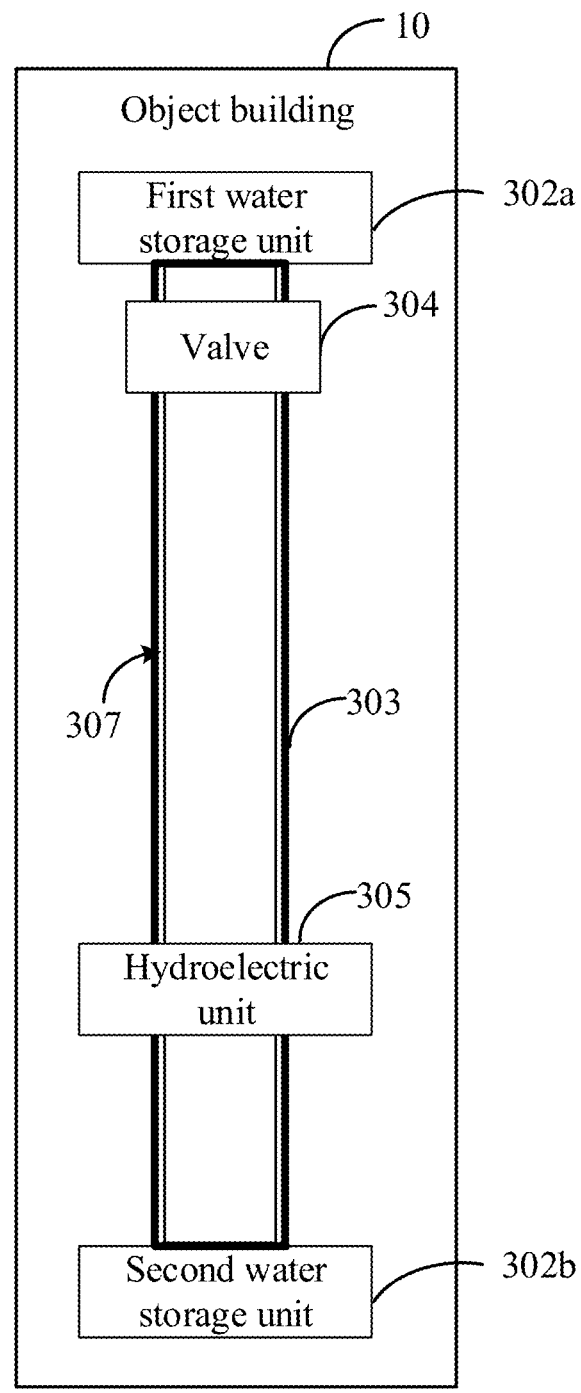
FIG. 3 a block diagram illustrating a building employing an energy managing system according to another embodiment of the present disclosure.

Referring to FIG. 3, in the object building 10, the plurality of water storage units 302 may include a first water storage unit 302a and a second water storage unit 302b. An installation position of the first water storage unit 302a is higher than an installation position of the second water storage unit 302b. For example, the first water storage unit 302a can be installed on a top floor of the object building 10, and the second water storage unit 302b installed on a bottom floor of the object building 10.

In one embodiment, each of the plurality of water storage units 302 can be a storage space for storing a certain amount of water, such as a water tank or a water pool. It can be understandable that the object building 10 may configure a water storage unit on at least one floor for meeting requirement of water use and/or fire prevention. The first water storage unit 302a and/or the second water storage unit 302b can directly use the current water storage unit in the object building 10, thus reducing an energy storage cost and a retrofit workload of the object building 10.

In one embodiment, one or more water storage units can be installed on each floor of the object building 10.

As shown in FIG. 3, the first water storage unit 302a and the second water storage unit 302b can be connected by a water pipeline 303, the water pipeline 303 is provided with a valve 304 and a hydroelectric unit 305. The valve 304 can be arranged at a connection of the water pipeline 303 and the first water storage unit 302a, and/or a connection of the water pipeline 303 and the second water storage unit 302b, so as to control water flow from one water storage unit into another water storage unit through the valve 304 and the water pipeline 303.

In one embodiment, the valve 304 can also be arranged other positions between the first water storage unit 302a and the second water storage unit 302b. The valve 304 can be one-way valves, multi-way valves, etc.

In one embodiment, the valve 304 can further achieve a control of a flow velocity of water or a flow quantity of water.

In one embodiment, two valves 304 and two water pipelines 303 can be arranged between the first water storage unit 302a and the second water storage unit 302b. One valve 304 and one water pipeline 303 are configured to transmit water flow from the first water storage unit 302a to the second water storage unit 302b, another valve 304 and another water pipeline 303 are configured to transmit water flow from the second water storage unit 302b to the first water storage unit 302a.

The hydroelectric unit 305 can convert kinetic energy generated by water flow into electrical energy. The hydroelectric unit 305 can be a hydroelectric turbine generator. A working principle of the hydroelectric turbine generator includes converting the kinetic energy of water flow into mechanical energy, and further converting the mechanical energy into the electrical energy. When water flows from high to low, gravitational potential energy of water is converted into kinetic energy, and the kinetic energy drives blades of a turbine to spin. The turbine transmits a rotating motion to a rotor of a generator through a shaft connected with the generator. When the rotor of the generator rotates, a magnetic field inside the generator changes. A change in the magnetic field generates an induced current inside the generator, thereby achieving a generation of electrical energy.

In one embodiment, each of the water pipelines 303 is provided with a buffer unit 307. The buffer unit 307 can be connected with the water pipelines 303 to reduce an influence of water flow movement with respect to the object building 10, and noises generated by water flow can also be reduced.

For example, the influence of water flow movement with respect to the object building 10 can be a mechanical impact with respect to a building structure of the object building 10. In view of influence force, the buffer unit 307 can be made of a material with mechanical protection and buffer, which can be set on an inner wall and/or an outer wall of the water pipeline, to protect the building structure of the object building 10 on a basis of not affecting a normal water transmission.

For example, the influence of water flow movement with respect to the object building 10 may be a noise influence. The buffer unit can be made of a material with noise reduction and noise prevention, which can be set on an inner wall and/or an outer wall of the water pipeline, to protect an acoustic environment of the object building 10 on a basis of not affecting a normal water transmission, and avoid an excessive noise of water flow affecting a normal work and life of users in the object building 10.

Figure 4:
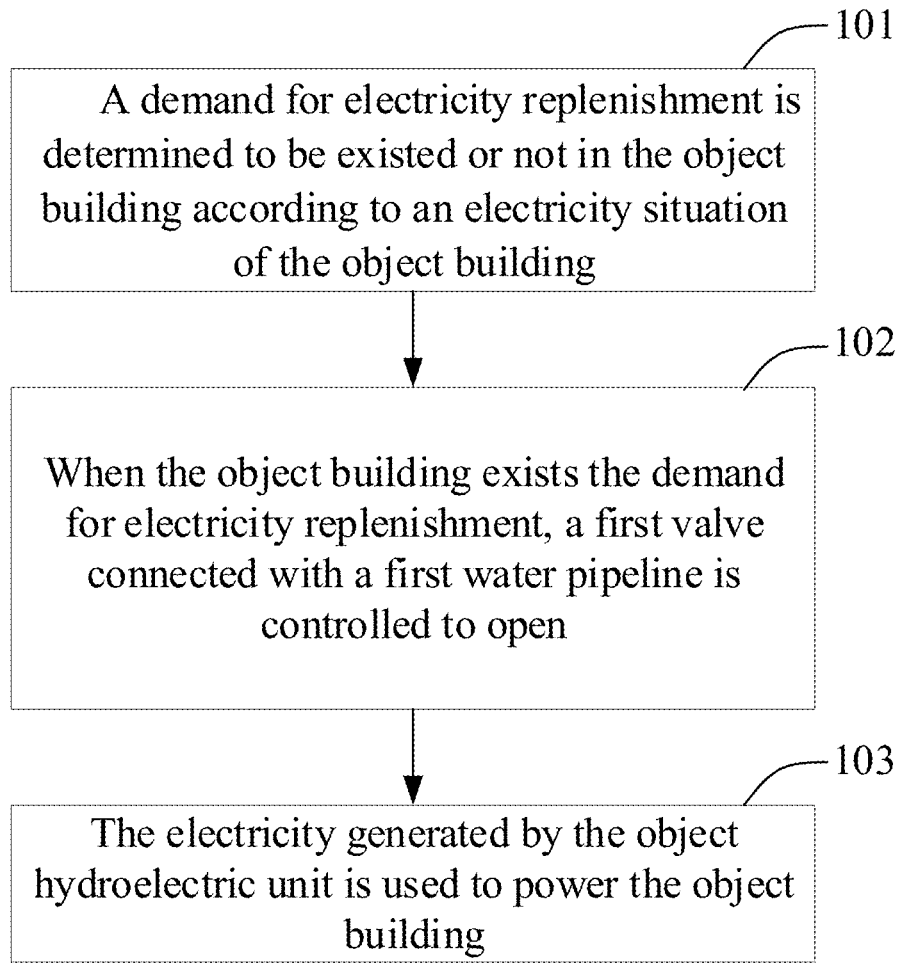
FIG. 4 is a flowchart illustrating an energy managing method according to another embodiment of the present disclosure.

FIG. 4 illustrates one exemplary embodiment of an energy managing method. The method can be applied to manage energy of an object building. The object building can be a building with a certain height, preferably a multi-floor building, such as a high-rise building. The flowchart presents an exemplary embodiment of the method. The exemplary method is provided by way of example, as there are a variety of ways to carry out the method. Each block shown in FIG. 4 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 101.

In block 101, a demand for electricity replenishment is determined to be existed or not in the object building according to an electricity situation of the object building.

In one embodiment, the electricity situation of the object building may include power supply information of the object building and/or a power demand of the object building.

In one embodiment, the power demand may include a power consumption quantity in a per unit time. The power supply information may indicate an electricity output situation of a power supply of the object building. The power supply can be mains supply or a preset energy storage unit arranged in the object building. The power supply information can be selected from a group consisting of a power supply quantity in a per unit time, a type of power supply, and a cost of power supply.

In one embodiment, per unit time can be one hour, one day, etc.

In one embodiment, the type of power supply can indicate a type of resource for generating electricity, such as renewable resources (for example, water, wind, solar, biomass, geothermal, tidal energy) and non-renewable resources (for example, thermal power).

When a power supply for the object building cannot meet the power demand of the object building, it is necessary to supplement energy for the object building, the object building can be determined to exist the demand for electricity replenishment.

In one embodiment, in order to improve an electricity security of the object building and timely response a change of power demand, the object building can be determined to exist the demand for electricity replenishment when the power demand of the object building is growing rapidly.

In one embodiment, considering that the power supply of the object building may be limited at a peak time, the object building can be determined to exist the demand for electricity replenishment when the time of power consumption is within the peak time, to ensure the power supply of the object building.

In one embodiment, when the cost of electricity is high, such as in a period of high electricity prices, the object building can be determined to exist the demand for electricity replenishment, to reduce a cost of electricity of the object building.

In one embodiment, when a preset condition is met, the object building is determined to exist the demand for electricity replenishment, the preset condition can be selected from a group consisting of: a change rate of power consumption quantity in per unit time being greater than a preset first change rate, the power consumption quantity in per unit time being greater than the power supply quantity in per unit time, and the cost of power supply being greater than a preset first cost.

In one embodiment, the preset first change rate can be set according to a statistical analysis of a historical power consumption of the object building, which is used to indicate an average power consumption change rate of the object building.

In one embodiment, considering that the power demand may relate to a season, such as for cooling and heating needs, power consumption of summer and winter may generally be higher than other seasons. Correspondingly, the power demand of the object building may be also related to activity routines of the users in the object building. For example, a power demand in a working period may be greater than a power demand in a non-working period. The preset first change rate can also be determined according to the current time.

When the change rate of power consumption quantity in per unit time is greater than a preset first change rate, it may indicate that the current power demand of the object building increases sharply, the object building exists the demand for electricity replenishment, to avoid occurring power safety events, such as power outage event.

When the power consumption quantity in per unit time is greater than the power supply quantity in per unit time, it indicates that the object building may occur insufficient power events, the object building needs to be supplemented with power supply.

When the cost of power supply is greater than the preset first cost, it indicates that the current cost of electricity is relatively high. By supplementing with power supply for the object building, the cost of electricity of the object building can be saved, a supply pressure of the mains supply can also be reduced, and hydropower generation with clean and environmentally friendly can be adopted to supply power for the object building.

In block 102, when the object building exists the demand for electricity replenishment, a first valve connected with a first water pipeline is controlled to open.

In one embodiment, the first water pipeline is installed between a first water storage unit and a second water storage unit, an installation position of the first water storage unit is higher than an installation position of the second water storage unit. When the first valve connected with the first water pipeline is opened, water stored in the first water storage unit can flow to the second water storage unit through the first water pipeline, and water flow in the first water pipeline can drive an object hydroelectric unit to generate electricity. The object hydroelectric unit can be a hydroelectric unit that can be drove by water flow from the first water storage unit to the second water storage unit.

Through a height difference between the first water storage unit and the second water storage unit, when the first valve connected with the first water pipeline is opened, the water stored in the first water storage unit can naturally flow into the second water storage unit under an action of gravity, without additional driving device to drive the water stored in the first water storage unit, which is a kind of environmental protection and energy saving power supplement. A conversion from water storage to electricity storage is realized by setting up a hydroelectric unit (object hydroelectric unit) in the first water pipeline, the hydroelectric unit can convert gravitational potential energy of water into kinetic energy, and furth convert the kinetic energy into electric energy. For example, a turbine of the object hydroelectric unit can be set in the first water pipeline.

Comparing with a gravity energy managing system, the embodiment uses water as energy storage medium, and a cost of water is less than a cost of heavy objects. Especially, in a high-rise building, water storage areas and water transmission pipelines are already established, causing a cost of deploying water energy managing system being low. Noises generated by water flow is far less than the falling of heavy objects, and water flow control is simple and effective. Therefore, the embodiment can make a use of characteristics of a water storage system and height differences between different floors of the object building, and design an energy storage and management system suitable for a high-rise environment, so as to achieve more efficient, safe, low-cost, and better energy management in the high-rise environment.

In one embodiment, when the object building does not exist the demand for electricity replenishment, the first valve connected with the first water pipeline can maintain closing.

Figure 5:
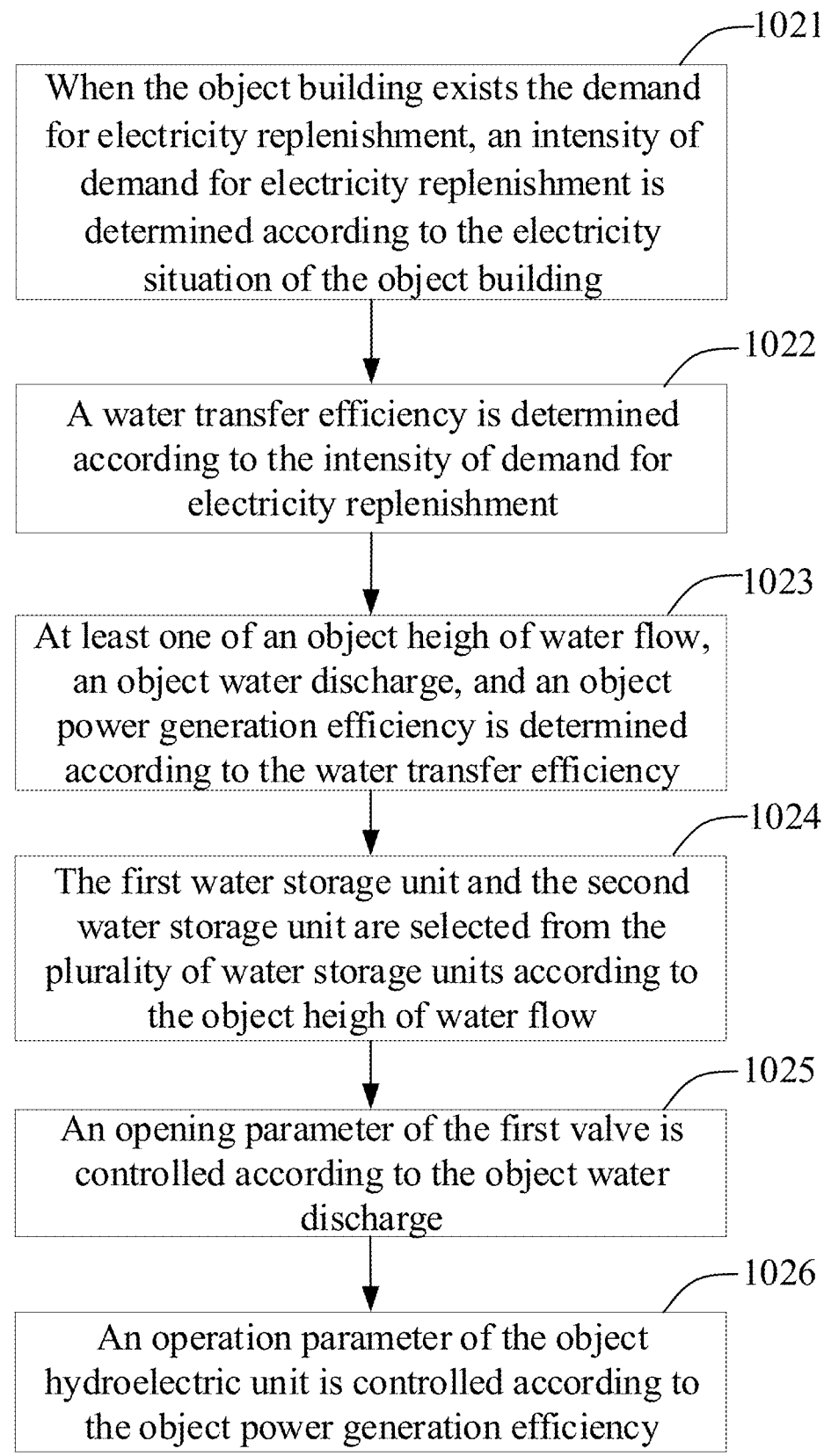
FIG. 5 is a sub-flowchart of the energy managing method shown in FIG. 4.

In one embodiment, in order to improve an efficiency of replenishing electrical energy for the object building, as shown in FIG. 5, block 102 may include block 1021~block 1026.

In block 1021, when the object building exists the demand for electricity replenishment, an intensity of demand for electricity replenishment is determined according to the electricity situation of the object building.

In one embodiment, the intensity of demand for electricity replenishment may be used to indicate an amount of electricity that the object building needs to replenish in per unit time. A power gap of the object building can be determined according to a comparison between the power demand and the power supply of the object building, and the intensity of demand for electricity replenishment can be determined according to the power gap of the object building.

In one embodiment, the greater the power gap, the greater the intensity of demand for electricity replenishment.

In one embodiment, a growth rate of power demand of the object building can be determined according to the power demand of the object building, and the intensity of demand for electricity replenishment can be determined according to the growth rate of power demand of the object building.

In one embodiment, the greater the growth rate of power demand, the greater the intensity of demand for electricity replenishment.

In block 1022, a water transfer efficiency is determined according to the intensity of demand for electricity replenishment.

In one embodiment, the water transfer efficiency may indicate an amount of object water discharge of a pipeline in per unit time. From a working principle of the hydroelectric unit, the greater the amount of object water discharge in per unit time, the greater the electricity generated by the hydropower unit in per unit time. The intensity of demand for electricity replenishment is positively correlated with the water transfer efficiency. The greater the intensity of demand for electricity replenishment of the object building, the greater the demand of object water discharge of the pipeline in per unit time.

In block 1023, at least one of an object heigh of water flow, an object water discharge, and an object power generation efficiency is determined according to the water transfer efficiency.

In one embodiment, the object heigh of water flow may indicate an intensity of gravitational potential energy giving to water flow for meeting the intensity of demand for electricity replenishment of the object building. The object water discharge may indicate a water flow in per unit time that needs to be fed into the hydropower unit for meeting the intensity of demand for electricity replenishment of the object building. The object power generation efficiency may indicate a power generation efficiency that the hydropower unit needs to achieve for meeting the intensity of demand for electricity replenishment of the object building. The object power generation efficiency can be determined according to a ratio between an input energy and an output energy of the hydropower unit, and the higher the object power generation efficiency, the higher the energy efficiency ratio of the hydropower unit in per unit time.

Taking the hydropower unit as a hydraulic turbine generator, a working principle of the hydraulic turbine generator is shown in the following formula:

$$P = \eta g * \eta t * \rho * g * Q * H.$$

P is a power generation, a unit of P is watt, 1 W=1 J/s; $\eta g$ is an efficiency of generator; $\eta t$ is an efficiency of water turbine; $\rho$ is a density of water (kg/m³, a standard density of water is 1000 kg/m³); g is an acceleration of gravity (usually 9.81 m/s²); Q is a water discharge (m³/s) and H is a height difference of water flow (m).

In block 1024, the first water storage unit and the second water storage unit are selected from the plurality of water storage units according to the object heigh of water flow.

In one embodiment, after determining the object heigh of water flow, the first water storage unit and the second water storage unit can be selected from the plurality of water storage units to meet the object heigh of water flow. For example, the second water storage unit can be the lowest water storage unit among the plurality of water storage units, the first water storage unit can be selected with respect to the second water storage unit to meet the object heigh of water flow.

In block 1025, an opening parameter of the first valve is controlled according to the object water discharge.

In one embodiment, the opening parameter can include an opening direction, an opening degree, and an opening angle. By controlling the opening parameter of the first valve, the water flow between the first water storage unit and the second water storage unit can be controlled, so that the water discharge between the first water storage unit and the second water storage unit can meet the object water discharge, to achieve higher power generation efficiency and meet an electricity supplement need of the object building.

In block 1026, an operation parameter of the object hydroelectric unit is controlled according to the object power generation efficiency.

In one embodiment, the operation parameter of the object hydroelectric unit can include the efficiency of generator, the efficiency of water turbine, etc. By controlling the operation parameter of the object hydroelectric unit, a higher power generation efficiency can be achieved and an electricity supplement need of the object building can be met.

In block 103, the electricity generated by the object hydroelectric unit is used to power the object building.

In one embodiment, the object building can be powered in real time by the electricity generated by the object hydroelectric unit.

In one embodiment, in order to provide energy availability and flexibility, the electricity generated by the object hydroelectric unit can be stored through a preset energy storage unit. Considering that in a urban environment, especially in high-rise buildings, energy storage units such as battery modules are generally prepared to prevent power outages or other events. Thus, the electricity generated by the object hydropower unit can be stored in the current energy storge unit of the object building.

In addition, the electricity generated by the object hydroelectric unit can also be provided to objects other than the object building, such as the mains supply, so as to achieve a feedback of the object building to the mains supply. The object building can be converted from an electricity user to a power supplier, to achieve a more sustainable cycle and healthier energy ecosystem.

In one embodiment, the energy managing method can use a natural height difference of the object building to convert the gravitational potential energy of water into electrical energy, the energy managing method can further user idle energy for water storage, to restore and replenish a self-electricity generation capacity of the object building, and realizing a self-sufficient urban energy management.

Figure 6:
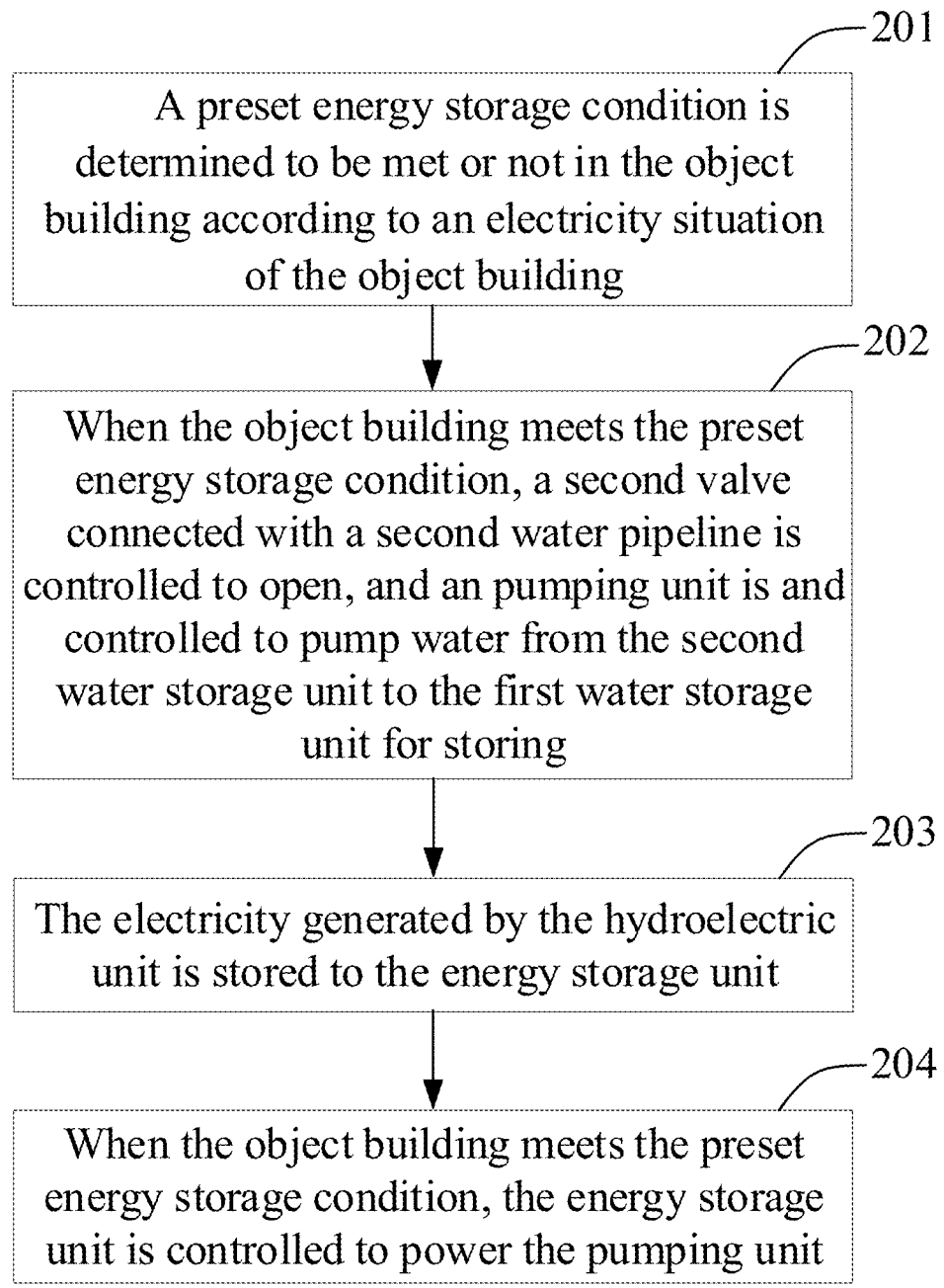
FIG. 6 is a flowchart illustrating an energy managing method according to another embodiment of the present disclosure.

Referring to FIG. 6, illustrates another exemplary embodiment of an energy managing method. The method can be applied to manage energy of an object building. The object building can be a building with a certain height, preferably a multi-floor building, such as a high-rise building. The flowchart presents an exemplary embodiment of the method. The exemplary method is provided by way of example, as there are a variety of ways to carry out the method. Each block shown in FIG. 6 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure.

In one embodiment, a plurality of water storage units are arranged at different heights/floors on the object building. The water storage units may be a storage space for storing a certain amount of water, such as a water tank or a water pool. It can be understandable that the object building may configure a water storage unit on at least one floor for meeting requirement of water use and/or fire prevention. The plurality of water storage units can directly use the current water storage units in the object building, thus reducing an energy storage cost and a retrofit workload of the object building.

In one embodiment, at least one water storage unit can be installed on each floor of the object building. The plurality of water storage units are connected by water pipelines. For example, each of two water storage units can be connected by a water pipeline.

Figure 7:
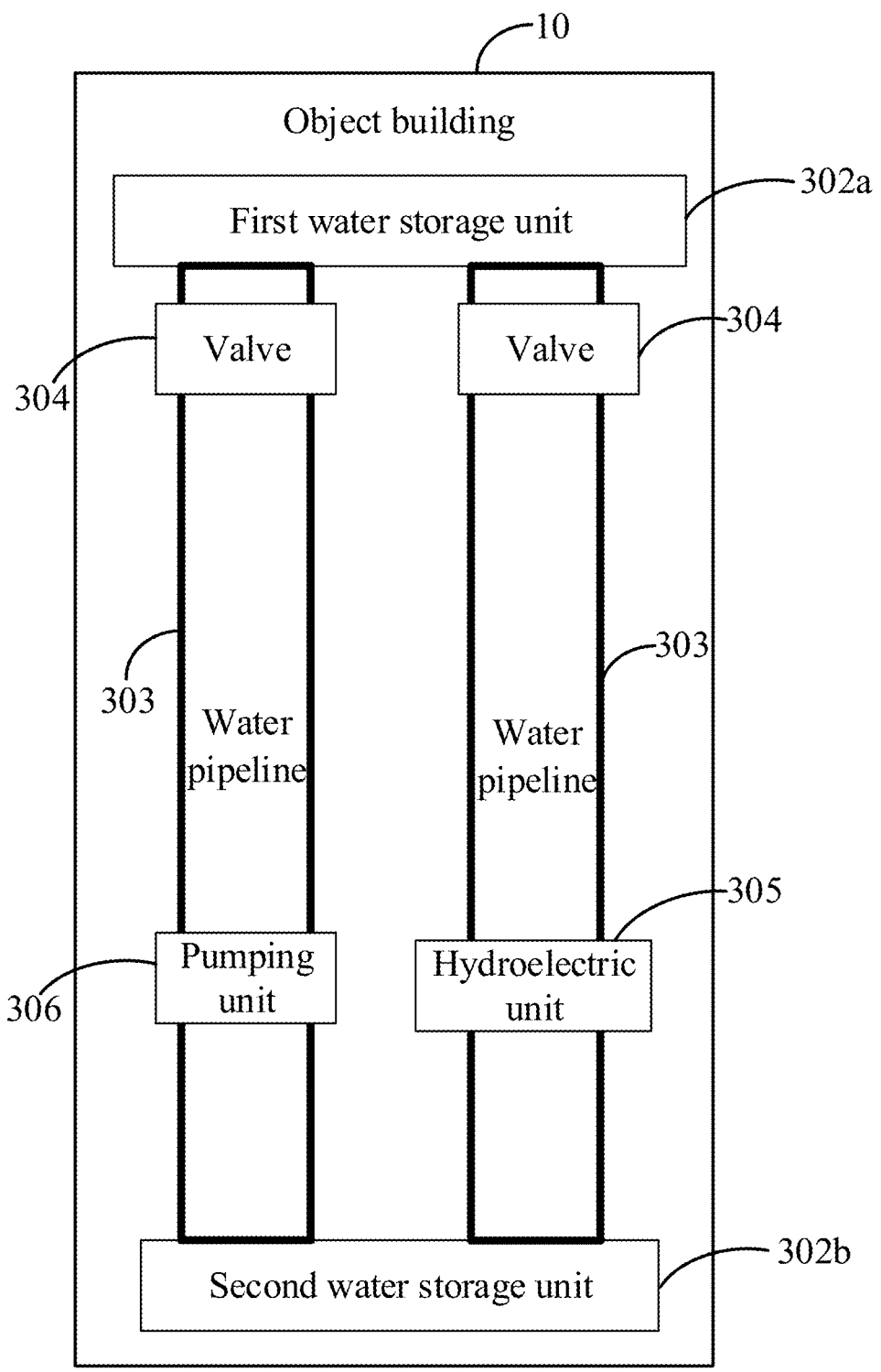
FIG. 7 is a block diagram illustrating a building employing an energy managing system according to another embodiment of the present disclosure.

Referring to FIG. 7, the plurality of water storage units 302 may include a first water storage unit 302*a* and a second water storage unit 302*b*, and water pipelines 303 between the first water storage unit 302*a* and the second water storage unit 302*b* are provided with two valves 304, a hydroelectric unit 305, and a pumping unit 306.

In one embodiment, an installation position of the first water storage unit 302*a* is higher than an installation position of the second water storage unit 302*b*, the two valves 304 can be arranged at connections of the two water pipelines 303 and the first water storage unit 302, so as to control water flow from one water storage unit into another water storage unit through the corresponding valve and the corresponding water pipeline.

In one embodiment, the two valves 304 can also be arranged other positions between the first water storage unit 302*a* and the second water storage unit 302*b*. Each of the two valves 304 can be one-way valves, multi-way valves, etc.

In one embodiment, the pumping unit 306 can be a pumping motor, or other devices with pumping water and driving water. An operation of the pumping unit 306 requires electricity.

As shown in FIG. 7, two independent water pipelines 303 can be set between the first water storage unit 302*a* and the second water storage unit 302*b*, and the two independent water pipelines 303 are respectively provided with the pumping unit 306 and the hydroelectric unit 305, so as to manage an energy of the object building in a finer granularity and avoid a mutual influence of energy storage and electric energy supplement.

Referring to FIG. 6, the example method can be begin at block 201.

In block 201, a preset energy storage condition is determined to be met or not in the object building according to an electricity situation of the object building.

A content description of the electricity situation of the object building is similar to block 101, and is not be described here.

The preset energy storage condition may indicate that the current energy storage is not affect a normal power consumption of the object building and/or an energy storage cost is less than a preset cost. For example, when the object building is in a period of low power demand, idle electricity energy may be existed, thus the idle electricity energy can be used to power the pumping unit, to achieve a recovery of hydraulic potential, and without affect the power supply of the object building.

In one embodiment, when a cost of energy storage is low, the energy storage is performed to store electricity and release stored electricity at a high cost electricity period, such as at a peak electricity consumption period, to reduce electricity cost.

In one embodiment, the preset energy storage condition can be selected from a group consisting of: a type of power supply being a renewable energy, a power supply quantity in per unit time being greater than a power consumption quantity in per unit time, a change rate of power consumption quantity in per unit time being less than a preset second change rate, and a cost of power supply being less than a preset second cost.

In one embodiment, the type of power supply can be a type for power the pumping unit or power the object building.

In one embodiment, the renewable energy may include solar energy, water energy, wind energy, biomass energy, wave energy, tidal energy, ocean thermal energy, geothermal energy, etc.

For example, with a popularity of renewable energy, such as wind energy and solar energy, intermittency and instability problems are becoming more and more prominent. An amount of electricity generated by solar and wind is affected by the weather, the power grid exists a demand on a stable energy storage system to balance power supply and power demand. The embodiment use the high-rise building as an energy storage unit, the high-rise building can store idle electricity during a period of low electricity demand and release stored electricity during a period of high electricity demand, achieving a balance between power supply and power demand and promoting a wider use of renewable energy. The embodiment can reduce carbon emissions and a dependence on fossil fuels, and have positive implications for environmental protection. Due to a strong variability of renewable energy and a uncertainty of available time, when the type of power supply is renewable energy, the energy storage can be performed to achieve an immobilization of variable renewable, improving energy storage efficiency.

In one embodiment, when the power supply quantity in per unit time is greater than the power consumption quantity in per unit time, or the change rate of power consumption quantity in per unit time is less than the preset second change rate, it indicates that the object building currently exist idle electricity in electricity consumption. In order to use the idle electricity, the energy storage can be performed. For example, the idle electricity can be configured to power the pumping unit to pump water.

In one embodiment, when the cost of power supply is less than the preset second cost, the low-cost electricity energy can be stored, and the stored electricity can be released when the cost of power supply is high, such as release the stored electricity in a peak of electricity consumption, so as to save the cost of power supply.

In one embodiment, the cost of power supply can be represented by an electricity price.

In block 202, when the object building meets the preset energy storage condition, a second valve connected with a second water pipeline is controlled to open, and an pumping unit is and controlled to pump water from the second water storage unit to the first water storage unit for storing.

In one embodiment, the second water pipeline is installed between the first water storage unit and the second water storage unit. When the second valve connected with the second water pipeline is opened, the pumping unit can pump water from the second water storage unit and drive pumped water flowing into the first water storage unit through the second water pipeline.

When the first water storage unit is higher than the second water storage unit, water is raised form the second water storage unit to the first water storage unit, water in the first water storage unit has a higher gravitational potential energy, which can be converted into electrical energy when needed. It is understandable that when the preset energy storage condition is met, the operation of the pumping unit does not cause a large electricity cost, or can achieve using renewable energy with high variability, which can improve energy utilization efficiency. For example, when it is at a peak of solar power supply (such as a period of high light) or a peak of wind power supply (such as a windy weather), idle electricity generated by renewable energy can be used to power the pumping unit, achieving storage and recovery of gravitational potential energy of water resources.

Figure 8:
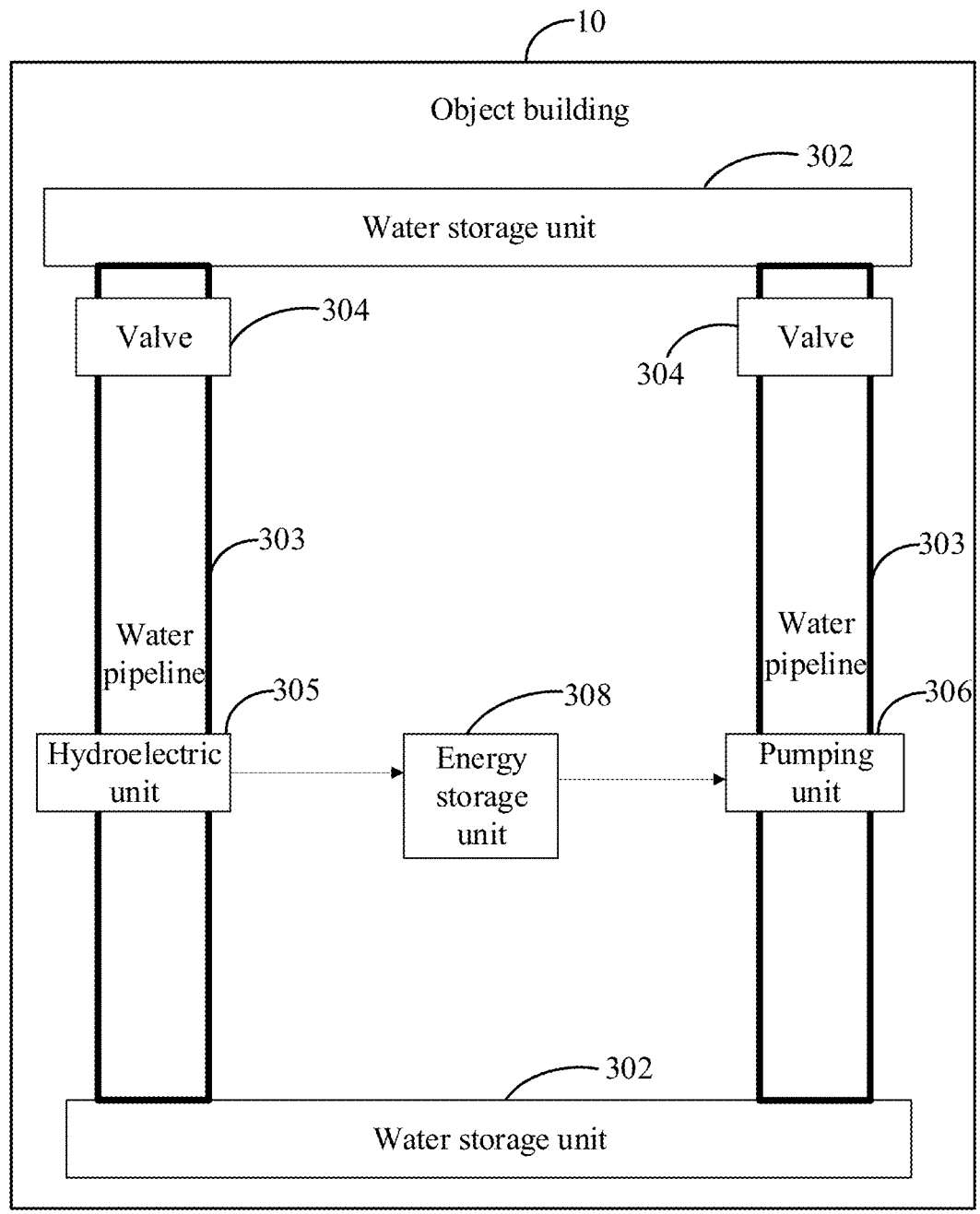
FIG. 8 is a block diagram illustrating a building employing an energy managing system according to another embodiment of the present disclosure.

In one embodiment, referring to FIG. 8, the object building may be provided with an energy storage unit 308, the energy storage unit 308 can be used to store energy. For example, the energy storage unit 308 may include one or more batteries.

Figure 9:
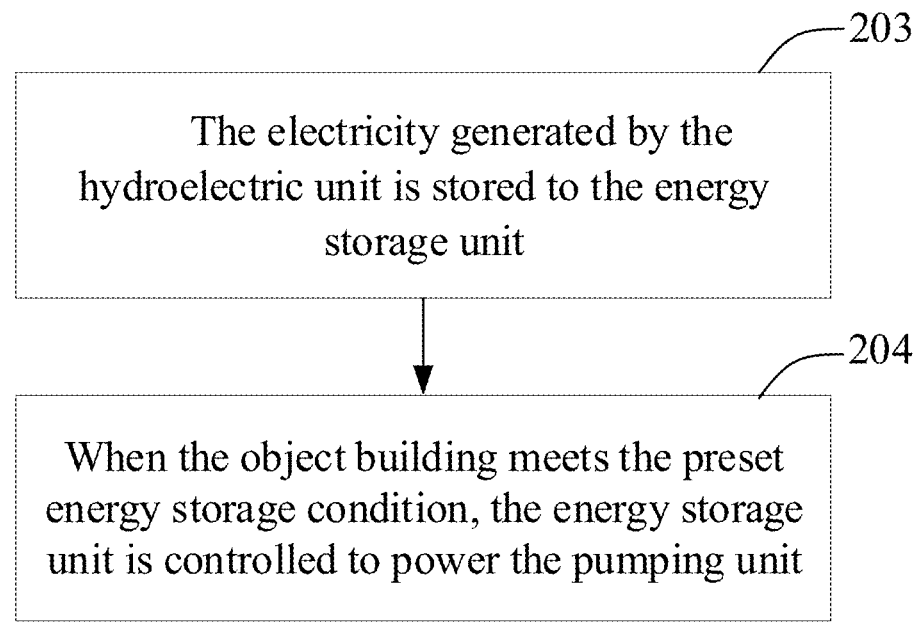
FIG. 9 is a sub-flowchart of the energy managing method shown in FIG. 6.

Referring to FIG. 9, the energy managing method may further include block 203 and block 204.

In block 203, the electricity generated by the hydroelectric unit is stored to the energy storage unit.

By storing the electricity generated by the hydropower unit into the energy storage unit, thus the object building can further be powered by the energy storage unit, improving stability and flexibility of power supply of the object building.

In block 204, when the object building meets the preset energy storage condition, the energy storage unit is controlled to power the pumping unit.

Different from using external energy (such as mains power) to drive the pumping unit, the embodiment uses the energy storage unit to drive the pumping unit, realizing a self effectively supplement of the object building, effectively reducing the cost of electricity consumption of the object building, and improving efficiency and stability of electricity consumption. The embodiment can further reduce a power pressure of the mains power. With a rapid growth of urban population, the mains power faces a risk of overload. If high-rise buildings can be used as distributed energy storage units, the high-rise buildings can alleviate burdens of the mains power without occupying additional resources, reduce a risk of power interruption, and improve stability and security of urban power supply system.

In one embodiment, considering the number of electric vehicles is increasing, and charging demands of the electric vehicles are difficult to ignore and buildings are generally provided with areas for parking and charging electric vehicles. Thus, the electric vehicles can also be incorporated into the energy management system of the object building.

Figure 10:
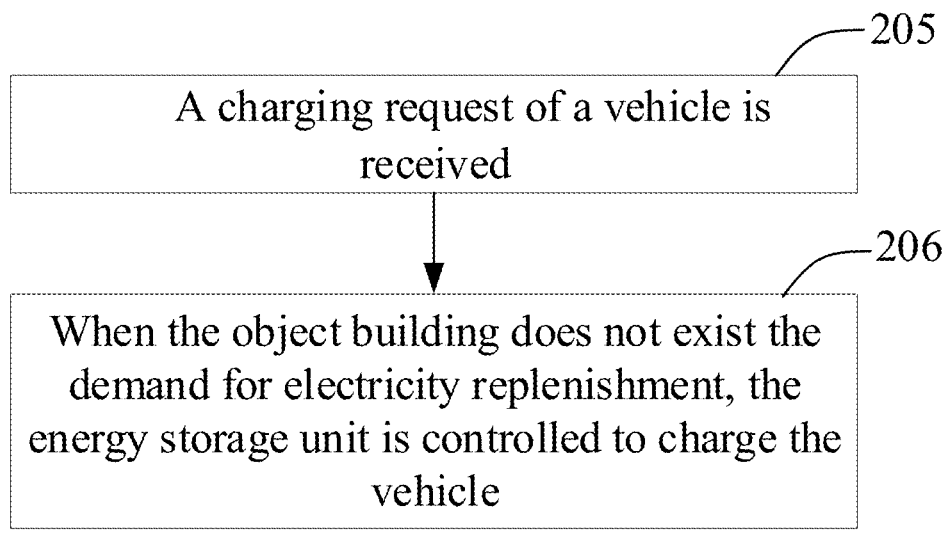
FIG. 10 is another sub-flowchart of the energy managing method shown in FIG. 6.

Referring to FIG. 10, the energy managing method may further include block 205 and block 206.

In block 205, a charging request of a vehicle is received. The vehicle can be an electric vehicle, a hybrid vehicle, etc.

In block 206, when the object building does not exist the demand for electricity replenishment, the energy storage unit is controlled to charge the vehicle.

Considering that a priority of power supply of the object building is higher than a priority of power supply of the vehicle, the energy storage unit of the object building is used to charge the vehicle when the object building does not exist the demand for electricity replenishment, so that the vehicle can be charged by excess renewable energy stored in the object building during a period of low electricity demand, and optimizing the urban energy management.

In one embodiment, when the vehicle is an electric vehicle with bidirectional charging, the energy managing method may further include: controlling the vehicle to charge the energy storage unit when the object building exists the demand for electricity replenishment.

Combining a bidirectional charging technology of electric vehicles, the electricity energy of the vehicle can be returned to the energy storage unit or a power grid of the object building during a period of peak demand, providing emergency power support for the object building and reducing a power pressure of the mains power. The embodiment can expand an energy management function of high-rise buildings, and further enhance flexibility and stability of urban energy network.

Figure 11:
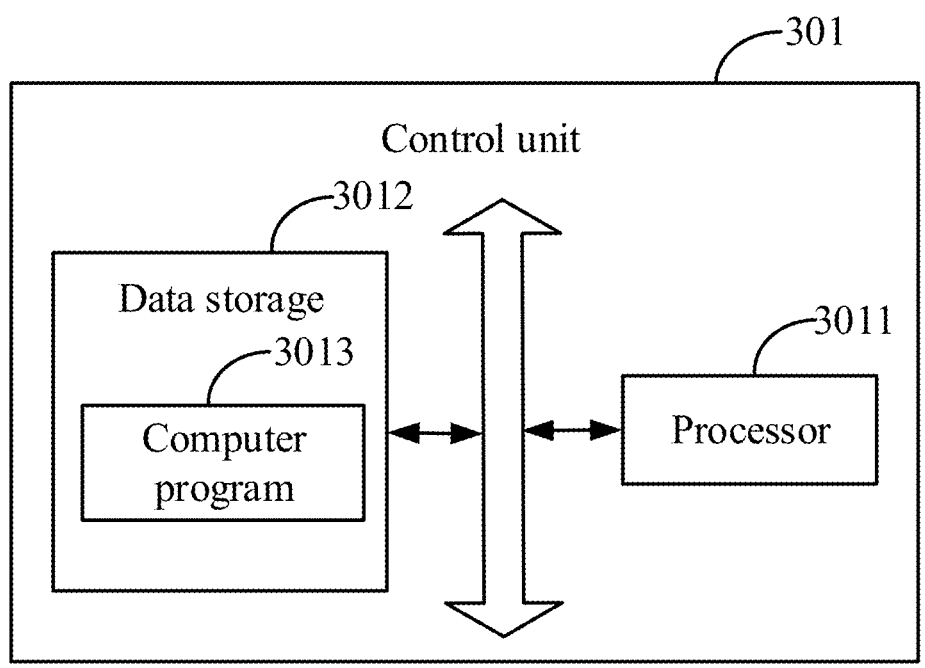
FIG. 11 is a block diagram illustrating a control unit according to an embodiment of the present disclosure.

Referring to FIG. 11, the control unit 301 may include at least one processor 3011, at least one data storage 3012, and a computer program 3013 that is stored in the data storage 3012 and can be run on the processor 3011. When the processor 3011 executes the computer program 3013, the energy managing method can be realized in the control unit 301, such as block 101 to block 103 shown in FIG. 4, block 1021 to block 1026 shown in FIG. 5, block 201~block 204 shown in FIG. 6, block 203~block 204 shown in FIG. 9, block 205~block 206 shown in FIG. 10, can be executed.

For example, when the processor 3011 executes the computer program 3013, the processor 3011 is caused to: determine whether the object building exists a demand for electricity replenishment according to an electricity situation of the object building; when the object building exists the demand for electricity replenishment, control a first valve connected with a first water pipeline to open, the first water pipeline being installed between a first water storage unit and a second water storage unit; and control an object hydroelectric unit to power the object building.

In one embodiment, an installation position of the first water storage unit is higher than an installation position of the second water storage unit, when the first valve connected with the first water pipeline is opened, water flow from the first water storage unit to the second water storage unit driving the object hydroelectric unit to generate electricity.

In one embodiment, the computer program 3013 be divided into one or more modules/units, and the one or more modules/units are stored in the data storage 3012 and executed by processor 3011. The module or units may be a series of computer instruction segments capable for completing a specific function, and the instruction segments are used for describing a execution process of the computer program 3013 in the control unit 301.

In one embodiments, the control unit 301 can be a computing device, a computer, a server, etc.

In one embodiments, comparing with FIG. 11, the control unit 301 can include more or less elements, for example, the control unit 301 can further include input/output devices, network access devices, communication devices, buses elements, etc.

In one embodiment, the processor 3011 can be a central processing unit (CPU), a microprocessor, a digital signal processors (DSP), an application specific integrated circuit (ASIC), a field-programmable gate array (FPGA), or other data processor chip that achieves the required functions.

The data storage 3012 can be used to store computer programs 40 and/or modules/units, and the processor 3011 can realize various functions of the control unit 301 by running or executing computer programs and/or modules/units stored in the data storage 3012 and calling up data stored in the data storage 3012. The data storage 3012 can be set in the control unit 301, or can be a separate external memory card, such as an SM card (Smart Media Card), an SD card (Secure Digital Card), or the like. The data storage 3012 can include various types of non-transitory computer-readable storage mediums. For example, the data storage 3012 can be an internal storage system, such as a flash memory, a random access memory (RAM) for the temporary storage of information, and/or a read-only memory (ROM) for permanent storage of information. The data storage 3012 can also be an external storage system, such as a hard disk, a storage card, or a data storage medium.

The embodiment also provides a non-transitory storage medium, the non-transitory storage medium is configured to store computer instructions, and when the computer instructions are run on the control unit 301, causes the control unit 301 to perform the above-mentioned energy managing method. The non-transitory storage medium can be a ROM, a hard disk, a storage card, etc.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An energy managing method applied to an object building, a plurality of water storage units being installed at different heights on the object building, the plurality of water storage units being connected through water pipelines, at least one valve and at least one hydroelectric unit being connected with the water pipelines, the energy managing method comprising:
   determining whether a demand for electricity replenishment of the object building is present according to an electricity situation of the object building, wherein the electricity situation of the object building comprises power supply information of the object building and/or a power demand of the object building, the power supply information is selected from a group consisting of a power supply quantity in a per unit time, a type of power supply, and a cost of power supply; the power demand comprises a power consumption quantity in per unit time;
   in a case that the demand for electricity replenishment of the object building is present, controlling a first valve connected with a first water pipeline to open, wherein the first water pipeline is installed between a first water storage unit and a second water storage unit, an installation position of the first water storage unit is higher than an installation position of the second water storage unit, wherein in response that the first valve connected with the first water pipeline is opened, water flow from the first water storage unit to the second water storage unit driving an object hydroelectric unit to generate electricity; and
   using the electricity generated by the object hydroelectric unit to power the object building;
   wherein in a case that a preset condition is met, the demand for electricity replenishment of the object building is determined to be present, the preset condition is selected from a group consisting of: a change rate of power consumption quantity in per unit time being greater than a preset first change rate, the power consumption quantity in per unit time being greater than the power supply quantity in per unit time, and the cost of power supply being greater than a preset first cost.

2. The energy managing method of claim 1, wherein at least one pumping unit is connected with the water pipelines, the energy managing method further comprises:
   determining whether the object building meets a preset energy storage condition according to the electricity situation of the object building; and
   in a case that the object building meets the preset energy storage condition, controlling a second valve connected with a second water pipeline to open and controlling an object pumping unit to pump water from the second water storage unit to the first water storage unit for storing, wherein the second water pipeline is installed between the first water storage unit and the second water storage unit.

3. The energy managing method of claim 2, wherein the preset energy storage condition is selected from a group consisting of: the type of power supply being a renewable energy, the power supply quantity in per unit time being greater than the power consumption quantity in per unit time, the change rate of power consumption quantity in per unit time being less than a preset second change rate, and the cost of power supply being less than a preset second cost.

4. The energy managing method of claim 2, wherein an energy storage unit is provided with the object building, the energy managing method further comprises:
   storing the electricity generated by the object hydroelectric unit to the energy storage unit.

5. The energy managing method of claim 4, further comprising:
   controlling the energy storage unit to power the object pumping unit in a case that the object building meets the preset energy storage condition.

6. The energy managing method of claim 4, further comprising:
   receiving a charging request of a vehicle; and
   controlling the energy storage unit to charge the vehicle in a case that the demand for electricity replenishment of the object building is determined to be not present.

7. The energy managing method of claim 6, wherein the vehicle is an electric vehicle with bidirectional charging, the method further comprises:
   controlling the vehicle to charge the energy storage unit in a case that the demand for electricity replenishment of the object building is determined to be present.

8. The energy managing method of claim 1, further comprising:
   in a case that the demand for electricity replenishment of the object building is determined to be present, determining an intensity of demand for electricity replenishment according to the electricity situation of the object building;

determining a water transfer efficiency according to the intensity of demand for electricity replenishment;

determining an object height of water flow according to the water transfer efficiency; and selecting the first water storage unit and the second water storage unit from the plurality of water storage units according to the object height of water flow.

9. The energy managing method of claim 8, further comprising:

determining an object water discharge according to the water transfer efficiency; and controlling an opening parameter of the first valve according to the object water discharge.

10. The energy managing method of claim 8, further comprising:

determining an object power generation efficiency according to the water transfer efficiency; and controlling an operation parameter of the object hydroelectric unit according to the object power generation efficiency.

11. The energy managing method of claim 1, wherein at least one buffer unit is provided and connected with the water pipelines to reduce an influence of water flow movement with respect to the object building.

12. An energy managing system comprising:

a control unit;

a plurality of water storage units, installed at different heights on an object building, the plurality of water storage units being connected through water pipelines;

at least one valve connected with the water pipelines, wherein the control unit is configured to control an operation state of the at least one valve to control a state of water flow in the water pipelines;

at least one hydroelectric unit connected with the water pipelines, wherein the control unit is further configured to control the at least one hydroelectric unit to convert kinetic energy of water flow into electrical energy; and at least one pumping unit connected with the water pipelines, wherein the control unit is further configured to control the at least one pumping unit to pump water and drive pumped water to flow along a preset direction;

wherein the control unit comprises at least one processor and a data storage, the data storage stores one or more programs which when executed by the at least one processor, cause the at least one processor to:

determine whether a for electricity replenishment of the object building is present according to an electricity situation of the object building, the electricity situation of the object building comprises power supply information of the object building and/or a power demand of the object building, the power supply information is selected from a group consisting of a power supply quantity in a per unit time, a type of power supply, and a cost of power supply; the power demand comprises a power consumption quantity in per unit time;

in a case that the demand for electricity replenishment of the object building is present, control a first valve connected with a first water pipeline to open, the first water pipeline is installed between a first water storage unit and a second water storage unit, an installation position of the first water storage unit is higher than an installation position of the second water storage unit, wherein in response that the first valve connected with the first water pipeline is opened, water flow from the first water storage unit to the second water storage unit driving an object hydroelectric unit to generate electricity; and control the object hydroelectric unit to power the object building;

wherein in a case that a preset condition is met, the demand for electricity replenishment of the object building is determined to be present, the preset condition is selected from a group consisting of: a change rate of power consumption quantity in per unit time being greater than a preset first change rate, the power consumption quantity in per unit time being greater than the power supply quantity in per unit time, and the cost of power supply being greater than a preset first cost.

13. The energy managing system of claim 12, wherein the at least one processor is further caused to:

determine whether the object building meets a preset energy storage condition according to the electricity situation of the object building; and in a case that the object building meets the preset energy storage condition, control a second valve connected with a second water pipeline to open and control an object pumping unit to pump water from the second water storage unit to the first water storage unit for storing, the second water pipeline is installed between the first water storage unit and the second water storage unit.

14. The energy managing system of claim 13, wherein the preset energy storage condition is selected from a group consisting of: the type of power supply being a renewable energy, the power supply quantity in per unit time being greater than the power consumption quantity in per unit time, the change rate of power consumption quantity in per unit time being less than a preset second change rate, and the cost of power supply being less than a preset second cost.

15. The energy managing system of claim 13, further comprising an energy storage unit, wherein the at least one processor is further caused to:

control the object hydroelectric unit to transmit the electricity to the energy storage unit.

16. The energy managing system of claim 15, wherein the at least one processor is further caused to:

control the energy storage unit to power the object pumping unit in a case that the object building meets the preset energy storage condition.

17. The energy managing system of claim 12, wherein the at least one processor is further caused to:

in a case that the demand for electricity replenishment of the object building is determined to be present, determine an intensity of demand for electricity replenishment according to the electricity situation of the object building;

determine a water transfer efficiency according to the intensity of demand for electricity replenishment;

determine an object height of water flow according to the water transfer efficiency; and select the first water storage unit and the second water storage unit from the plurality of water storage units according to the object height of water flow.

18. The energy managing system of claim 17, wherein the at least one processor is further caused to:

determine an object water discharge according to the water transfer efficiency; and control an opening parameter of the first valve according to the object water discharge.

19. The energy managing system of claim 17, wherein the at least one processor is further caused to:
   determine an object power generation efficiency according to the water transfer efficiency; and
   control an operation parameter of the object hydroelectric unit according to the object power generation efficiency.

20. A building comprising an energy managing system, the energy managing system comprising:
   a control unit;
   a plurality of water storage units, installed at different heights on an object building, the plurality of water storage units being connected through water pipelines;
   at least one valve, connected with the water pipelines, wherein the control unit is configured to control an operation state of the at least one valve, to control a state of water flow in the water pipelines;
   at least one hydroelectric unit, connected with the water pipelines, wherein the control unit is further configured to control the at least one hydroelectric unit to convert kinetic energy of water flow into electrical energy; and
   at least one pumping unit, connected with the water pipelines, wherein the control unit is further configured to control the at least one pumping unit to pump water and drive pumped water to flow along a preset direction;
   wherein the control unit comprises at least one processor and a data storage, the data storage stores one or more programs which when executed by the at least one processor, cause the at least one processor to:
      determine whether a demand for electricity replenishment of the object building is present according to an electricity situation of the object building, the electricity situation of the object building comprises power supply information of the object building and/or a power demand of the object building, the power supply information is selected from a group consisting of a power supply quantity in a per unit time, a type of power supply, and a cost of power supply; the power demand comprises a power consumption quantity in per unit time;
      in a case that the demand for electricity replenishment of the object building is present, control a first valve connected with a first water pipeline to open, the first water pipeline is installed between a first water storage unit and a second water storage unit, an installation position of the first water storage unit is higher than an installation position of the second water storage unit, wherein in response that the first valve connected with the first water pipeline is opened, water flow from the first water storage unit to the second water storage unit driving an object hydroelectric unit to generate electricity; and
      control the object hydroelectric unit to power the object building;
      wherein in a case that a preset condition is met, the demand for electricity replenishment of the object building is determined to be present, the preset condition is selected from a group consisting of: a change rate of power consumption quantity in per unit time being greater than a preset first change rate, the power consumption quantity in per unit time being greater than the power supply quantity in per unit time, and the cost of power supply being greater than a preset first cost.

* * * * *